(12) United States Patent
Breitbart et al.

(10) Patent No.: US 6,502,095 B2
(45) Date of Patent: Dec. 31, 2002

(54) TIMESTAMP-BASED SYSTEM AND METHOD FOR SERIALIZING LAZY UPDATES IN A DISTRIBUTED DATABASE

(75) Inventors: Yuri J. Breitbart, Scotch Plains, NJ (US); Raghavan V. Komondoor, Madison, WI (US); Rajeev Rastogi, New Providence, NJ (US); Srinivasan Seshadri, Basking Ridge, NJ (US); Abraham Silberschatz, Warren, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/391,988

(22) Filed: Sep. 9, 1999

(65) Prior Publication Data

US 2002/0087501 A1 Jul. 4, 2002

(51) Int. Cl.$^7$ ............................................. G06F 17/30
(52) U.S. Cl. ............................ 707/8; 707/10; 707/102; 707/103; 707/104
(58) Field of Search ............................ 707/3, 2, 1, 10, 707/103, 102, 104, 8

(56) References Cited

U.S. PATENT DOCUMENTS

| | | | | |
|---|---|---|---|---|
| 5,806,065 A | * | 9/1998 | Lomet ............................ | 707/8 |
| 5,842,196 A | * | 11/1998 | Agarwal et al. ............... | 707/2 |
| 5,864,851 A | * | 1/1999 | Breithbart et al. ............. | 707/8 |
| 5,999,931 A | * | 12/1999 | Breitbart et al. .............. | 707/10 |

OTHER PUBLICATIONS

Johnson et al., "Lazy updates for distributed search structure", ACM, pp. 337–346, year 1993.*

Jukka Teuhola, "Deferred maintenance of replicated objects", IEEE, pp. 476–481, Jan. 1996.*

Johnson et al., "distributed indices for accessing distributed data", IEEE, pp. 199–207, Jan. 1993.*

Jukka Teuhola, "Deferred Maintenance of Replicated Objects in Single–Site Database", IEEE, pp. 476–481, Jan. 1996.

T. Johnson and P. Krishna, "Distributed Indices for Accessing Distributed Data", IEEE, pp. 199–207, Jan. 1993.

J. Gray and A. Reuter, "Transaction Processing: Concepts and Techniques, Chapter 7: Islation Concepts", 1993, pp. 375, 390–391, Morgan–Kaufmann Publishers, San Mateo, CA.

Parvathi Chundi, Daniel J. Rosenkrantz and S.S. Ravi, "Deferred Updates and Data Placement in Distributed Databases", Research Supported by NSF Grant CCR–90–06396.

Parvathi Chundi, Daniel J. Rosenkrantz, S. S. Ravi. Department of Computer Science, University at Albany—State University of New York. *Deferred Updates and Data Placement in Distributed Databases*. Research Supported by NSF Grant CCR–90–06396.

J. Gray and A. Reuter, *Transaction Processing: Concepts and Techniques*, Chapter 7: *Isolation Concepts*, pp. 375, 390–391. Morgan–Kaufmann Publishers, San Mateo, CA, 1993.

* cited by examiner

*Primary Examiner*—Jean M. Corrielus
(74) *Attorney, Agent, or Firm*—Hitt, Gaines & Boisbrun, PC

(57) ABSTRACT

A system for, and method of, ensuring serialization of lazy updates in a distributed database described by a directed acyclic copy graph. In one embodiment, the system includes: (1) a timestamp module that creates a unique timestamp for each of the lazy updates and (2) a propagation module, associated with the timestamp module, that employs edges of the directed acyclic copy graph to propagate the lazy updates among replicas in the distributed database according to said unique timestamp and ensure the serialization.

21 Claims, 4 Drawing Sheets

TIMESTAMP-BASED SYSTEM AND METHOD FOR SERIALIZING LAZY UPDATES IN A DISTRIBUTED DATABASE

TECHNICAL FIELD OF THE INVENTION

The present invention is directed, in general, to distributed databases and, more specifically, to a timestamp-based system and method for serializing lazy updates in a distributed database.

BACKGROUND OF THE INVENTION

Database systems were first implemented at only a single database site. As the number of distributed applications requiring access to the database increased, the complexity, size and the time required to access the database systems also increased. Shortly thereafter, a single database site became unable to process all the information in a timely manner.

To correct this database processing problem, companies developed new database systems in which the database was replicated at different sites along a network. With the use of replicated databases, distributed applications were able to achieve a higher level of performance, reliability and availability. However, the higher level of performance came with a price.

Replicated databases improved performance, but management of the replicated data became vastly more complicated. Gigabytes of data are replicated in distributed data warehouses and various World Wide Web sites on the Internet. In telecom as well as data networks, network management applications require real-time dissemination of updates to replicas with strong consistency guarantees.

Two broad approaches have been developed to handle the problem of replica updates in a distributed database system, an eager protocol and a lazy protocol. The eager protocol updates all the replicas of an item as part of a single transaction. Thus, an eager protocol ensures that executions are serializable. However, a major disadvantage of an eager protocol's algorithms is that the number of operations in the transaction increases with the degree of replication, and since deadlock probability is proportional to the fourth power of the transaction size, eager protocols are unlikely to scale beyond a small number of sites.

In contrast, the lazy protocol posts updates to replicas through independent transactions that are spawned by the original updating transaction after it commits. Thus, the effective size of a transaction is reduced and the overall performance of the system improves due to fewer deadlocks. However, transaction execution must be orchestrated carefully to ensure serializability across the entire distributed database.

Due to its superior performance benefits, a number of conventional database management programs (e.g., Sybase®, Oracle®, CA-OpenIngres®) provide support for updating via a lazy protocol. Specifically, these programs provide an option in which each transaction executes locally, and then is propagated asynchronously to replicas after it commits (the replicas at each site are updated in the context of a separate transaction). Since each transaction executes locally and independently, the systems do not require multi-site commit protocols (e.g., two-phase commit) which tend to introduce blocking and are thus not easily scalable.

A problem, however, with the lazy replication approaches of most conventional systems is that they can easily lead to non-serializable executions. For instance, it is possible, for the same data item to be concurrently updated at two different sites, thus resulting in an update conflict. Currently, commercial systems use reconciliation rules (e.g., install the update with the later timestamp) to merge conflicting updates. These rules do not guarantee serializability, unless the updates are commutative.

Therefore, what is needed in the art is a way to guarantee serializability-of updates within a replicated database system.

SUMMARY OF THE INVENTION

To address the above-discussed deficiencies of the prior art, the present invention provides a system for, and method of, ensuring serialization of lazy updates in a distributed database described by a directed acyclic copy graph. In one embodiment, the system includes: (1) a timestamp module that creates a unique timestamp for each of the lazy updates and (2) a propagation module, associated with the timestamp module, that employs edges of the directed acyclic copy graph to propagate the lazy updates among replicas in the distributed database according to said unique timestamp and ensure the serialization.

The present invention therefore introduces the broad concept of employing the edges of the directed acyclic copy graph that describes the distributed database and unique timestamps associated with each of the lazy updates to propagate the lazy updates to the various replicas in the distributed database. In this manner, serialization can be guaranteed in distributed databases described by directed acyclic copy graphs.

In one embodiment of the present invention, the unique timestamp is a function of relationships between each of the lazy updates and a site location within the directed acyclic copy graph. In an embodiment to be illustrated and described, the unique timestamp takes the form of at least one tuple vector.

In one embodiment of the present invention, the unique timestamp is augmented for each sub-transaction to serialize updates to the replicas. In the embodiment to be illustrated and described, the unique timestamp is augmented by added tuples, allowing the propagation of the associated update through the distributed database to be tracked.

In one embodiment of the present invention, the timestamp module creates a lexicographic ordering of tuples for the directed acyclic copy graph and the unique timestamp is a function of the lexicographic ordering of tuples. In a related embodiment, the propagation module serializes the lazy updates as a function of a lexicographic ordering of tuples.

In one embodiment of the present invention, the unique timestamp is a tuple vector. Of course, the timestamp may comprise other or further information to establish the ordering of propagation.

In one embodiment of the present invention, a counterpart of the system is located at each replica of the distributed database. A replica is a site that comprises a copy of the whole database or a site that contains at least one element of the database. Alternatively, the system may be located at a single replica site, or at fewer than all sites.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
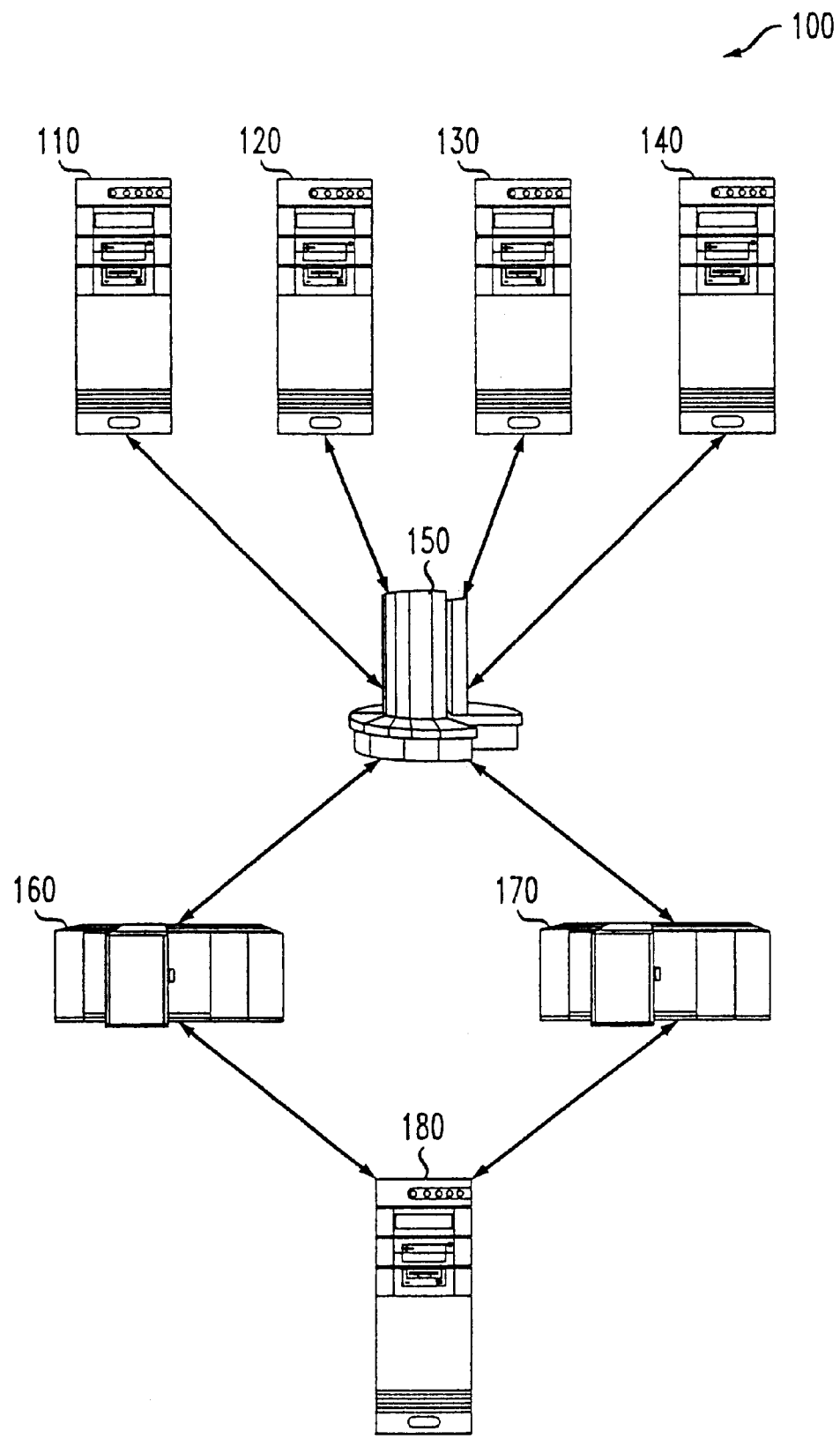
FIG. 1 illustrates a block diagram of a distributed database system that forms one environment within which the present invention can operate.

Referring initially to FIG. 1, illustrated is a block diagram of a distributed database system, generally designated 100, that forms one environment within which the present invention can operate. The distributed database system 100 comprises a plurality of database computer systems operating at remote sites 110, 120, 130, 140, a main database computer system 150, department database computer systems 160, 170 and an analyst computer system 180. In the illustrated embodiment of the present invention, the distributed database system 100 may comprise any number of remote sites 110, 120, 130, 140, main database computer systems 150, department database computer systems 160, 170 and analyst computer systems 180.

The remote sites 110, 120, 130, 140 comprise replicated data and are coupled to the main database computer system 150 via a combination of networks and telecommunications lines. The main database computer system 150 comprises the primary database for the distributed database system 100. In another embodiment of the present invention, the main database computer system 150 comprises a primary database site for a portion of the data within the distributed database system 100.

The main database computer system 150 is also coupled to the department database computer systems 160, 170 via a combination of networks and telecommunications lines. The department database computer systems 160, 170 comprise a secondary site for the replicated data within the distributed database system 100.

The analyst database computer system 180 is coupled to the department database computer system 160 and to the department database computer system 170 via a combination of networks and telecommunications lines. The analyst database computer system 180 comprises replicated data of the distributed database system 100.

In the illustrated embodiment, each of the remote sites 110, 120, 130, 140, the main database computer system 150, the department database computer systems 160, 170 and the analyst database computer system 180 also comprise distributed applications that access data contained within the replicated databases and programs which propagate the transaction updates throughout the distributed database system 100. In another embodiment of the present invention, only the main database computer system 150 and the department database computer systems 160, 170 contain programs which propagate database updates throughout the distributed database system 100.

In a third embodiment of the present invention, any one of the remote sites 110, 120, 130, 140, the main database computer systems 150, the department database computer systems 160, 170 and the analyst computer system 180 may be either the primary site or a secondary site for a plurality of database items in the distributed database system 100. In all cases, only one distributed database site may be the primary site for a particular database item.

Figure 2:
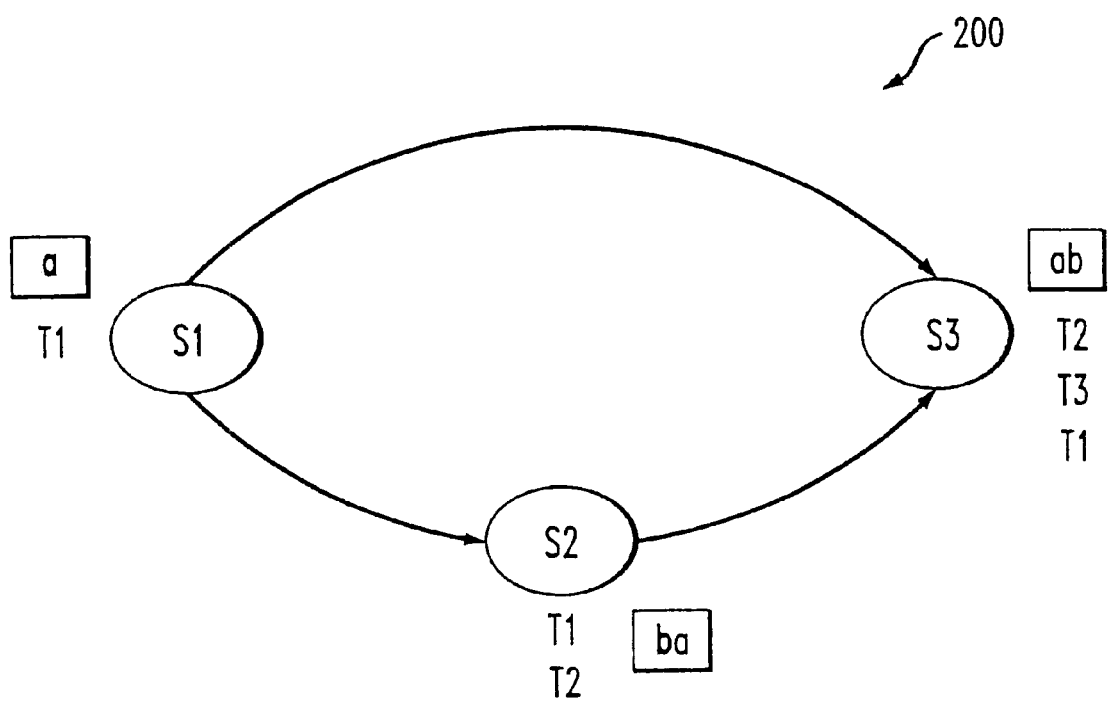
FIG. 2 illustrates a block diagram of a directed acyclic copy graph with non-serializable execution problem.

Turning now to FIG. 2, illustrated is a block diagram of a directed acyclic copy graph ("DAG") with non-serializable execution problem, generally designated 200. The problem of ensuring execution serializability of a copy graph is that existing approaches use lazy replication protocols that guarantee serializability if and only if the undirected graph obtained from a copy graph is acyclic. However, since replica updates are propagated arbitrarily, their algorithms cannot ensure serializability if the copy graph is a directed acyclic copy graph. This non-serializability problem is illustrated by FIG. 2.

Consider the distributed system, shown in FIG. 2, with three sites and two items a and b. The primary site for a is S1 with secondary copies at S2 and S3, while the primary site for b is S2 and a secondary copy is at S3. The copy graph is the DAG 200 as shown in FIG. 2.

Now consider three transactions, T1 at site S1, T2 at site S2 and T3 at site S3. T1 simply updates item a, T2 reads a and writes b while T3 reads both items a and b. Assuming lazy propagation of updates to replicas, it is possible for T1's update to reach site S2 before T2 executes. It is also possible for T1's update to reach site S3 after T2's update to b has been applied and transaction T3 has completed execution. Since T1 is serialized before T2 at site S2, but T2 is serialized before T1 at site S3, applying T1's update would corrupt the replica data. at site S3.

Therefore, the current lazy propagation protocols cannot guarantee serializability of T1's update at site S3.

Background information concerning copy graphs is discussed in Transaction Processing: Concepts and Techniques by Jim Grey and Andreas Reuter, Morgan Kauffman Publishers 1993. Background information concerning serializability is discussed in Deferred Updates and Data Placement in Distributed Databases by P. Chundi, et al., in Proceedings of the Twelfth International Conference on Data Engineering, New Orleans, La. 1996. The foregoing publications are incorporated herein by reference.

Figure 3:
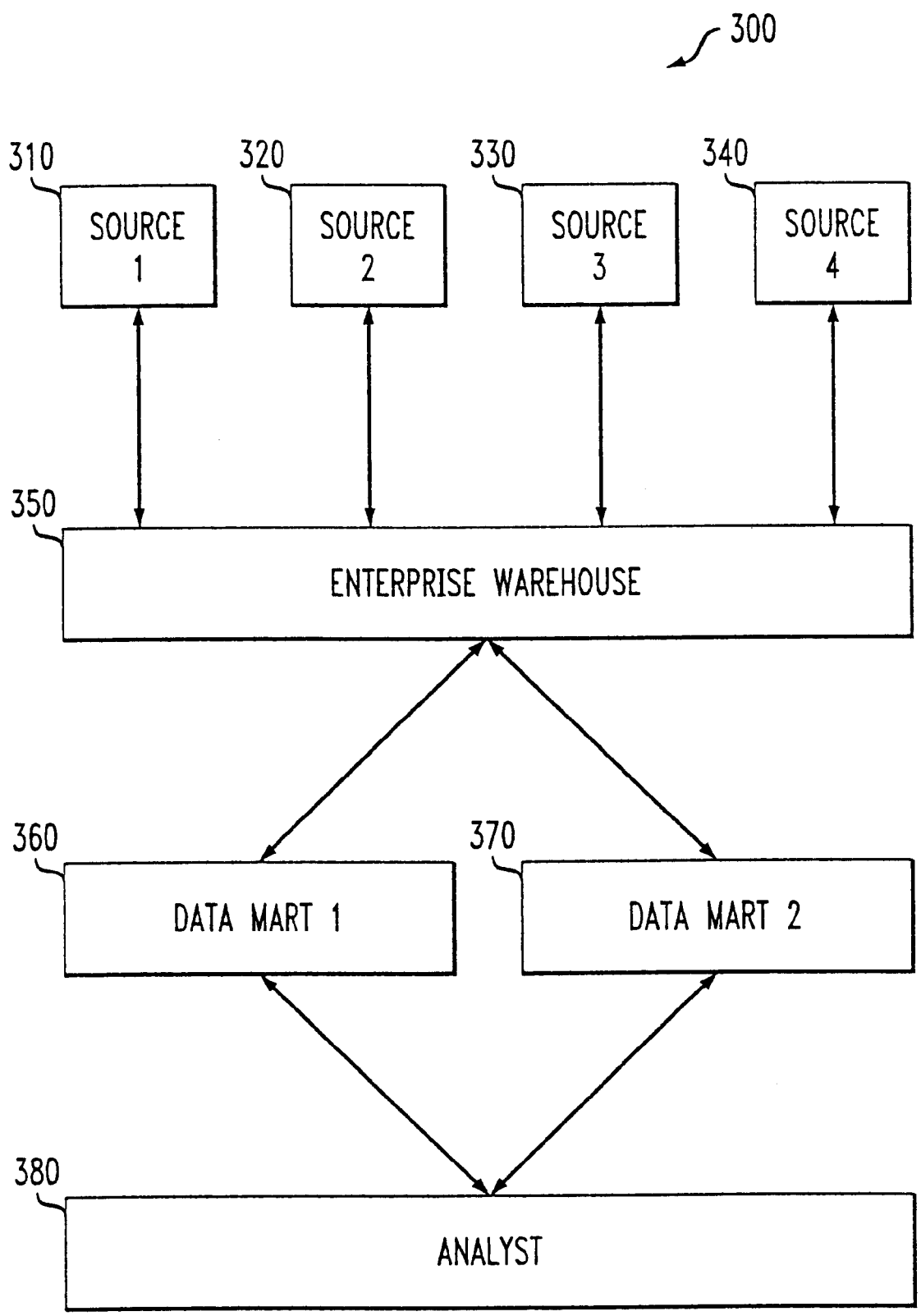
FIG. 3 illustrates a block diagram of a typical data warehousing environment.

Turning now to FIG. 3, illustrated is a block diagram of a typical data warehousing environment, generally designated 300.

The data warehousing environment 300 is one example of a natural situation in which the copy graph for propagating updates is a DAG.

The data warehousing environment 300 typically comprises sources 310, 320, 330, 340, an enterprise warehouse 350, data marts 360, 370 and an analyst 380. The sources 310, 320, 330, 340 are coupled to the enterprise warehouse 350. The sources 310, 320, 330, 340 collect data from the warehousing environment and send the data to the enterprise warehouse 350 via a network (not shown).

The enterprise warehouse 350 comprises a primary copy of the distributed database and programs that collect and propagate replica updates. The enterprise warehouse 350 is also coupled to the data marts 360, 370 via a network. The enterprise warehouse 350 collects updates from the sources 310, 320, 330, 340 and updates the primary database. After updating the primary database, the enterprise warehouse 350 propagates the updates to the other computer systems within the data warehousing environment 300.

The data marts 360, 370 are also coupled via the network (not shown) to the analyst 380 and comprise replica databases and programs that collect and propagate replica updates. The data marts 360, 370 are also the database source for a number of department applications within the data warehouse environment 300.

When a department application updates the one of the data marts' replica databases, the corresponding data mart propagates the replica update to the other computer systems within the data warehousing environment 300.

The analyst 380 comprises a replica database and programs that collect and propagate replica updates. The analyst 380 is the local database source for analyst applications within the data warehousing environment 300. When an analyst application updates the analyst's replica database, the analyst 380 propagates the replica update to the other computer systems within the data warehousing environment 300.

In another embodiment of the present invention, any one of the sources 310, 320, 330, 340, the enterprise warehouse 350, the data marts 360, 370 and the analyst 380 may be either the primary site or a secondary site for a plurality of database items in the data warehousing environment 300. In all cases, only one distributed database site may be the primary site for a particular database item.

The current update protocols used in the data. warehousing environment refresh the warehouse periodically (e.g., every night), while shutting out queries from the warehouse. Alternately, the current update protocols allow queries on the warehouse and concurrently perform locking at remote sites. Clearly, both are undesirable. One embodiment of the present invention, to be described in FIG. 4, comprises a serialization system which allows the updates to be propagated without either requiring the database to go off-line or requiring transactions to acquire locks at multiple sites.

Figure 4:
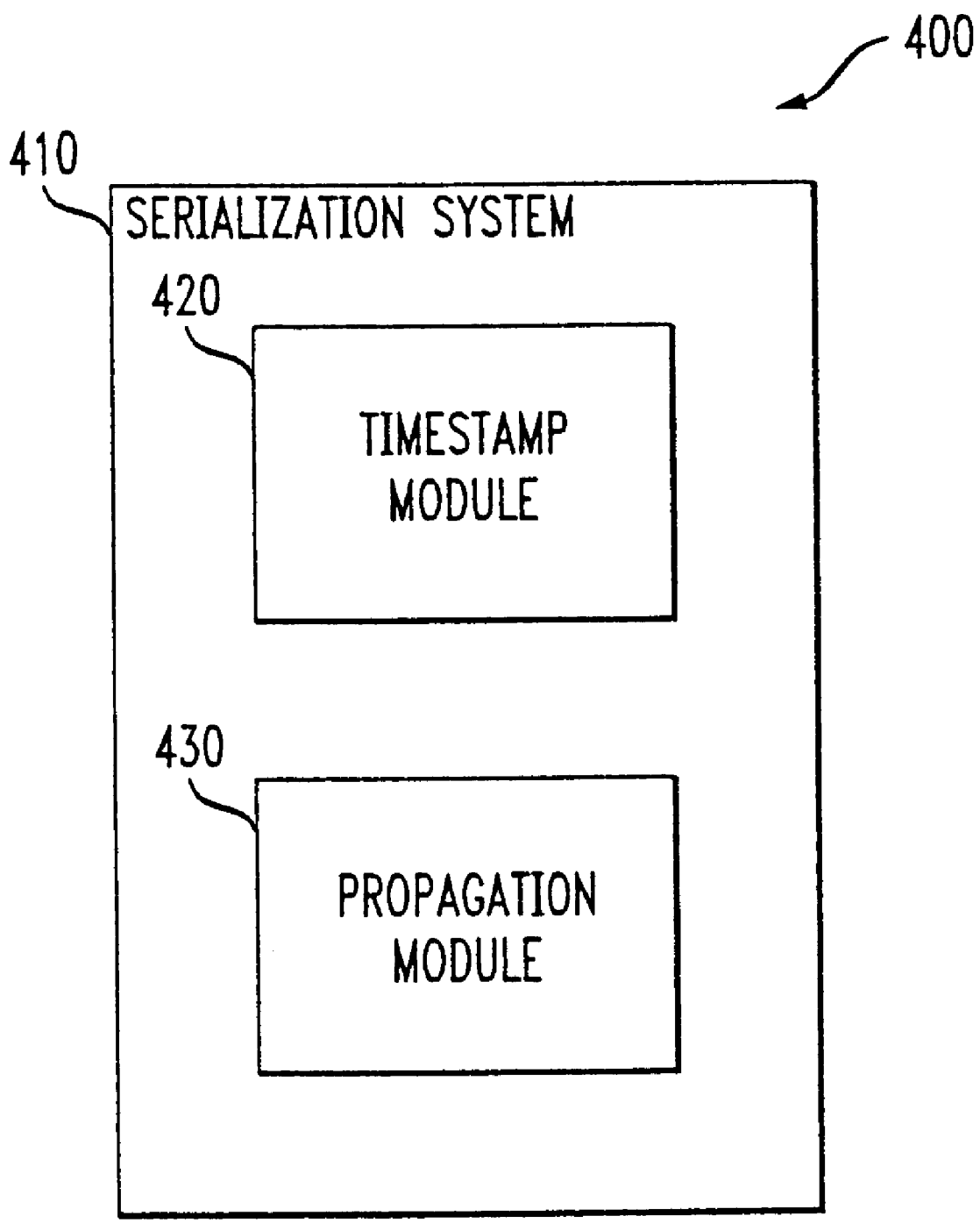
FIG. 4 illustrates a block diagram of a serialization system that ensures serialization of lazy updates in a distributed database described by a DAG.

Turning now to FIG. 4, illustrated is a block diagram of a serialization system 410 that ensures serialization of lazy updates in a distributed database described by a DAG. The serialization system 410 comprises a timestamp module 420 and a propagation module 430.

The timestamp module 420 creates a unique timestamp for each lazy update in the distributive database system 100. A lazy update comprises two types of transactions, a primary sub-transaction and secondary sub-transactions. The primary sub-transaction is a transaction that occurs at the single site. The secondary sub-transactions are the primary sub-transaction's updates that are forwarded to the other sites in the distributed database system 100.

The timestamp module 420 creates the unique timestamp for each primary sub-transaction when the primary sub-transaction commits. The propagation module 430 propagates the primary sub-transaction's unique timestamp with each of the secondary sub-transactions to the appropriate secondary sites in the distributed database system 100.

In a second embodiment of the present invention, the timestamp module 420 creates a unique timestamp that is a function of the relationships between each of the lazy updates and the site location within the DAG.

In a third embodiment of the present invention, the timestamp module 420 creates a timestamp that comprises a tuple vector. A tuple is an ordered pair $(s_i, LTS_i)$, where $s_i$ is the site id and $LTS_i$ is the timestamp for a transaction when it commits at site $s_i$. A tuple vector is a vector comprising a tuple for a site $s_i$ and each of $s_i$'s ancestor sites. An ancestor site is a site where the lazy update's transactions were applied prior to that site.

For example, the timestamp at site $s_i$ may comprise the following tuple vector: $(S_a,4)$ $(s_c,2)$ $(s_j,0)$. In this example, the first tuple $(s_a,4)$ corresponds to the timestamp for the primary sub-transaction that occurred at site $s_a$. Then the transaction was sent to the second site $s_c$ and applied. After the transaction was applied at the second site $s_c$ the tuple vector was augmented to contain $(s_a,4)$ $(s_c,2)$. The augmented tuple vector shows that the transaction originated a site $s_a$ and was then applied at site $s_c$. Next, the transaction was sent to the third site $s_j$. After the transaction was applied at the third site $s_j$, the tuple vector was augmented to contain $(s_a,5)$ $(s_c,2)$ $(s_j,0)$. The augmented tuple vector shows that the transaction originated a site $s_a$, was then applied at site $s_c$ and was finally applied at the third site $s_j$ The use of tuple vectors as timestamps allows the propagation of lazy updates to be traced to each site where the updates were applied.

In order to maintain serialization with timestamps comprising tuple vectors, the timestamp module 420 creates a lexicographic ordering of tuples. A lexicographic ordering of tuples is accomplished by assigning each site in the distributed database system 100 with a number. If a site has descendant sites, then that site's number must be smaller than its descendant sites' numbers. A tuple comprising a site assigned a lower number is ordered before a tuple comprising a site assigned a higher number. If site $s_a$ is before site $s_b$ in the lexicographic ordering, then $s_a$'s transactions are to be applied before site $s_b$'s transactions.

Associated with the timestamp module 420 is the propagation module 430. The propagation module 430 propagates lazy updates along the edges of the DAG itself according to the unique timestamp created by the timestamp module 420. In one embodiment of the present invention, the propagation module 430 sends updates directly to the relevant sites rather than routing the updates through intermediate nodes as was done in the related co-pending application of Breitbart, et al., for a "System and Method for Serializing Lazy Updates in a Distributed Database Without Requiring Timestamps." A site is relevant if either the site or one of its descendant sites contains a replica of an item that the sub-transaction has updated.

In another embodiment of the present invention, the propagation module 430 serializes the lazy updates in the distributed database system 100 as a function of the lexicographic ordering of tuples. When there is more than one lazy update to apply at a particular site, the propagation module 430 applies the lazy update with a timestamp that has an earlier lexicographic order than the other lazy updates' timestamps.

In determining which timestamp has an earlier lexicographic order (designated as "<"), the propagation module 430 compares the first timestamp $TS_1$ against the second timestamp $TS_2$. The propagation module 430 defines $TS_1<TS_2$ if and only if one of two conditions exists. The first condition is if $TS_1$ is a prefix of $TS_2$ then $TS_1<TS_2$. For example, if $TS_1$ contains $(s_a,5)$ $(s_c,2)$ and $TS_2$ contains $(s_a,4)$ $(s_c,2)$ $(s_j,0)$, then $TS_1$ is a prefix of $TS_2$. Therefore, the propagation module 430 applies the lazy update associated with the timestamp $TS_1$ first.

The second condition applies if $TS_1$ is not a prefix of $TS_2$. To determine which timestamp has an earlier lexicographic order, let $TS_1=X(s_i, LTS_i)Y_i$ and $TS_2=X(s_j, LTS_j)Y_2$. In this condition, $TS_1$, and $TS_2$ share a common prefix X of tuples and the first pair of tuples that the timestamps differ on is $(s_i, LTS_i)$ and $(s_j, LTS_j)$ Then $TS_1<TS_2$ if: (1) $s_i>s_j$, or (2) $s_i=s_j$ and $LTS_i<LTS_j$.

The following are examples of the above test for determining the lexicographic ordering of timestamps:

(1) $(S_1,1)<(s_1,1)(s_2,1)$
(2) $(S_1,1)(s_3,1)<(s_1,1)(s_2,1)$
(3) $(S_1,1)(s_2,1)<(s_1,1)(S_2,2)$

Note that the tuples within the timestamps still appear in the order of their sites. It is only when the propagation module 430 compares two timestamps that the propagation module 430 uses the reverse ordering of sites to determine which timestamp has an earlier lexicographic order.

An example of the serialization system 410 ensuring serialization of a DAG with a non-serializable execution problem can be shown using FIG. 2. Consider the same three transactions T1, T2 and T3 as described in FIG. 2. T1 updates item a at site S1. T2 reads a and writes b at site S2. T3 reads both a and b at site S3.

After T1 commits as site S1, the timestamp module 420 creates a timestamp for T1's primary sub-transaction that reflects the transaction at site S1. T1's timestamp comprises (S1,1). Then, the propagation module 430 propagates T1's update to site S2 and S3. After T1's update has been applied at site S2, the timestamp module 420 augments T1's timestamp. T1's timestamp now contains (S1,1)(S2,0) which reflects the update at site S2.

Now T2 commits at site S2. The timestamp module 420 creates a timestamp for T2 comprising (S1,1) (S2,1). T2's timestamp incorporates information about T1's update of a that was serialized before T2's reading of a and writing of b at site S2. Then, the propagation module 430 propagates T2's update to site S3.

Site S3 now has T1's update with timestamp (S1,1) (S2,0) and T2's update with timestamp (S1,1) (S2,1). In determining which update to serialize first, the propagation module 430 applies the previous defined rules for determining the lexicographic order of timestamps.

In this case, the second condition exists. Both timestamps share a common prefix of tuples, (S1,1). Since both timestamps differ on the second tuple and both tuples contain the same site id, S2, the propagation module 430 compares the site transaction timestamps. Here T1's transaction timestamp for its second tuple (S2,0) at site s2 is 0. T2's transaction timestamp for its second tuple (S2,1) at site 2 is 1. T1's transaction timestamp of 0 is less than T2's transaction timestamp of 1. Therefore, the propagation module 430 serializes T1's update before. serializing T2's update at site S3 and resolves the non-serializable execution problem associated with the DAG of FIG. 2.

One skilled in the art should know that the present invention is not limited to using a lexicographic ordering of timestamps that comprise tuple vectors. Nor is the present invention limited to the order in which the propagation module 430 determines which lazy update to serialize first. Also, other methods of determining which timestamp represent an earlier transaction for lazy updates in a directed acyclic graph are within the scope of this invention. Other embodiments of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. A system for ensuring serialization of lazy updates in a distributed database described by a directed acyclic copy graph, comprising:
   a timestamp module that creates a unique timestamp for each of said lazy updates; and
   a propagation module, associated with said timestamp module, that employs edges of said directed acyclic copy graph to propagate said lazy updates among replicas in said distributed database according to said unique timestamp and ensure said serialization.

2. The system as recited in claim 1 wherein said unique timestamp is a function of relationships between each of said lazy updates and a site location within said directed acyclic copy graph.

3. The system as recited in claim 1 wherein said unique timestamp is augmented for each sub-transaction to serialize updates to said replicas.

4. The system as recited in claim 1 wherein said timestamp module creates a lexicographic ordering of tuples for said directed acyclic copy graph and said unique timestamp is a function of said lexicographic ordering of tuples.

5. The system as recited in claim 1 wherein said propagation module serializes said lazy updates as a function of a lexicographic ordering of tuples.

6. The system as recited in claim 1 wherein said unique timestamp is a tuple vector.

7. The system as recited in claim 1 wherein a counterpart of said system is located at each replica of said distributed database.

8. A method of ensuring serialization of lazy updates in a distributed database described by a directed acyclic copy graph, comprising:
   creating a unique timestamp for each of said lazy: updates; and
   employing edges of said directed acyclic copy graph to propagate said lazy updates among replicas in said distributed database according to said unique timestamp and ensure said serialization.

9. The method as recited in claim 8 wherein said unique timestamp is a function of relationships between each of said lazy updates and a site location within said directed acyclic copy graph.

10. The method as recited in claim 8 wherein said unique timestamp is augmented for each sub-transaction to serialize updates to said replicas.

11. The method as recited in claim 8 wherein said creating comprises creating a lexicographic ordering of tuples for said directed acyclic copy graph and said unique timestamp is a function of said lexicographic ordering of tuples.

12. The method as recited in claim 8 wherein said employing comprises serializing said lazy updates as a function of a lexicographic ordering of tuples.

13. The method as recited in claim 8 wherein said unique timestamp is a tuple vector.

14. The method as recited in claim 8 wherein said method is carried out at each replica of said distributed database.

15. A distributed database described by a directed acyclic copy graph, comprising:
   at least one primary site;
   at least two secondary sites; and
   a system for ensuring serialization of lazy updates among said at least one primary site and said at least two secondary sites, including:
      a timestamp module that creates a unique timestamp for each of said lazy updates, and a propagation module, associated with said timestamp module, that employs edges of said directed acyclic copy graph to propagate said lazy updates among replicas in said distributed database according to said unique timestamp and ensure said serialization.

16. The distributed database as recited in claim 15 wherein said unique timestamp is a function of relationships between each of said lazy updates and a site location within said directed acyclic copy graph.

17. The distributed database as recited in claim 15 wherein said unique timestamp is augmented for each sub-transaction to serialize updates to said replicas.

18. The distributed database as recited in claim 15 wherein said timestamp module creates a lexicographic ordering of tuples for said directed acyclic copy graph and said unique timestamp is a function of said lexicographic ordering of tuples.

19. The distributed database as recited in claim 15 wherein said propagation module serializes said lazy updates as a function of a lexicographic ordering of tuples.

20. The distributed database as recited in claim 15 wherein said unique timestamp is a tuple vector.

21. The distributed database as recited in claim 15 wherein a counterpart of said system is located at each replica of said distributed database.

* * * * *